United States Patent
Adams

(10) Patent No.: US 10,880,274 B2
(45) Date of Patent: Dec. 29, 2020

(54) METHOD OF CONTROL OF ONLINE SHARING OF DIGITAL PHOTOGRAPHS AND VIDEO

(71) Applicant: BlackBerry Limited, Waterloo (CA)

(72) Inventor: Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 210 days.

(21) Appl. No.: 15/849,298

(22) Filed: Dec. 20, 2017

(65) Prior Publication Data

US 2019/0190895 A1 Jun. 20, 2019

(51) Int. Cl.
| | |
|---|---|
| G06F 16/51 | (2019.01) |
| H04N 1/44 | (2006.01) |
| H04L 29/06 | (2006.01) |
| H04N 1/00 | (2006.01) |
| G06Q 50/00 | (2012.01) |

(52) U.S. Cl.
CPC .......... *H04L 63/0428* (2013.01); *G06F 16/51* (2019.01); *H04L 63/0861* (2013.01); *H04L 63/10* (2013.01); *H04L 63/102* (2013.01); *H04N 1/00127* (2013.01); *H04N 1/00153* (2013.01); *H04N 1/00156* (2013.01); *H04N 1/44* (2013.01); *G06Q 50/01* (2013.01)

(58) Field of Classification Search
CPC ............ G06F 21/6245; G06K 9/00221; H04N 1/00156; H04N 1/444; G06Q 50/01; H04L 63/102
See application file for complete search history.

(56) References Cited

U.S. PATENT DOCUMENTS

| | | | | |
|---|---|---|---|---|
| 8,577,131 B1* | 11/2013 | Li | .......... | G06K 9/6256 |
| | | | | 382/159 |
| 8,744,143 B2* | 6/2014 | Chen | ........... | G06F 21/6245 |
| | | | | 382/118 |
| 9,396,354 B1* | 7/2016 | Murphy | ........... | G06F 21/6245 |
| 2012/0250951 A1* | 10/2012 | Chen | .......... | G06F 21/6245 |
| | | | | 382/118 |
| 2014/0196152 A1* | 7/2014 | Ur | ........... | G06F 21/60 |
| | | | | 726/26 |
| 2015/0047050 A1* | 2/2015 | Das | ........... | G06F 21/10 |
| | | | | 726/26 |
| 2015/0169575 A1* | 6/2015 | Adam | ........... | G06F 16/58 |
| | | | | 707/728 |

(Continued)

OTHER PUBLICATIONS

European Patent Application No. 18211737.4, Extended European Search Report dated Feb. 11, 2019.

*Primary Examiner* — Lynn D Feild
*Assistant Examiner* — Vladimir I Gavrilenko
(74) *Attorney, Agent, or Firm* — Borden Ladner Gervais LLP; Geoffrey deKleine

(57) ABSTRACT

A method for authorizing online sharing of content including a digital photograph or video, includes receiving, at an electronic device, the content, identifying an image of a person in the content, identifying authorization conditions associated with the person, identifying an image of an object or audio in the content, based on both the image of the person identified and the image of the object or audio identified, determining if the authorization conditions associated with the person are met, and in response to determining that the authorization conditions are met, providing online access to the digital photograph or video.

19 Claims, 5 Drawing Sheets

(56) References Cited

U.S. PATENT DOCUMENTS

| | | | |
|---|---|---|---|
| 2016/0092472 A1* | 3/2016 | Feder | G06F 16/51 |
| | | | 382/306 |
| 2016/0171288 A1* | 6/2016 | Badwal | G06K 9/00288 |
| | | | 382/118 |
| 2016/0330522 A1* | 11/2016 | Newell | G06F 21/604 |
| 2017/0353769 A1* | 12/2017 | Husain | H04N 21/26258 |
| 2018/0139203 A1* | 5/2018 | Dolan | H04L 63/0861 |
| 2019/0109915 A1* | 4/2019 | McPhee | H04L 67/26 |
| 2019/0272384 A1* | 9/2019 | Kawabata | G09C 1/00 |

* cited by examiner

METHOD OF CONTROL OF ONLINE SHARING OF DIGITAL PHOTOGRAPHS AND VIDEO

FIELD OF TECHNOLOGY

The present disclosure relates to online sharing of digital photographs and video.

BACKGROUND

Electronic devices, such as simple cellular telephones, smart telephones, wireless PDAs, and computers, have gained widespread use and may provide a variety of functions including, for example, telephonic, electronic messaging and other personal information manager (PIM) application functions, camera functions, Web access, social media related functions and others.

Such electronic devices are often used to capture digital images including photographs or video, or obtain digital images that, by communication with a second electronic device, such as a server at a social media site, may be shared or made available for online access by a third party.

Such online sharing of digital images, including photographs or video may present privacy concerns for individuals whose images are captured in the digital images. In some situations, control over the content made available to others is desirable.

BRIEF DESCRIPTION OF THE DRAWINGS

Embodiments of the present disclosure will now be described, by way of example only, with reference to the attached figures, in which.

DETAILED DESCRIPTION

Figure 1:
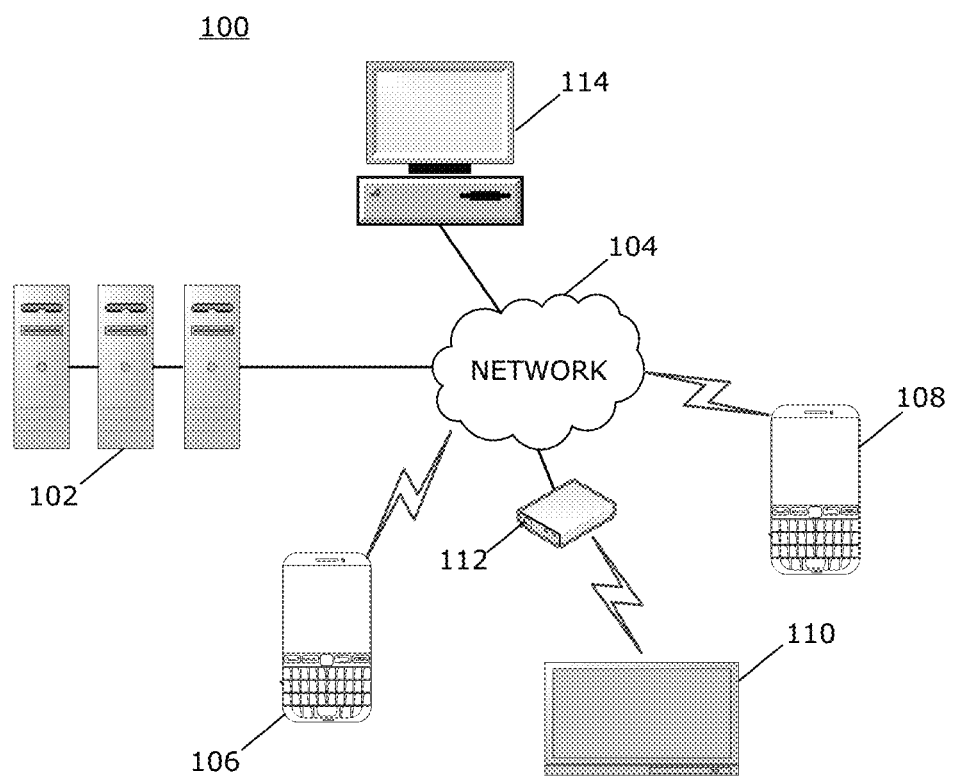
FIG. 1 is a block diagram of a system including an electronic device for online sharing of content including digital photographs or digital video in accordance with the present disclosure.

The following describes an electronic device and a method of authorizing online sharing of content including a digital photograph or video. The method includes receiving, at an electronic device, the content including the digital photograph or video, identifying an image of a person in the digital content, identifying authorization conditions associated with the person, identifying an image of an object or audio in the digital content, based on both the image of the person identified and the image of the object or audio identified, determining if the authorization conditions associated with the person are met, and in response to determining that the authorization conditions are met, providing online access to the digital photograph or video.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 shows a block diagram of a system including an electronic device for online sharing of content including digital photographs or video in accordance with the present disclosure. The system is indicated generally by the numeral 100. The system 100 includes an electronic device or devices providing a service 102 for web-based storage and sharing of information, including digital photographs or video. Examples of such a service 102 include social media and social networking services.

In the present application, the term digital photographs includes photographs or video that are born digital, such as images or video captured utilizing a digital camera that are maintained in digital format, as well as digitized photographs or video, such as images scanned utilizing a digital scanner.

The service 102 is connected to a network 104, which includes the internet and may include a cellular network in addition to the internet. Several communication devices may communicate through the network 104.

Communication devices located remotely from the service 102 may communicate with other communication devices via the network 104 and may send and receive signals from the service 102, via the network 104.

The communication devices may include a portable electronic device, such as the smartphone devices 106, 108 wirelessly connected to the network 104. The communication devices may also include a laptop computer 110 wirelessly coupled to the network 104 via a wireless access point 112, or a desktop computer 114. Other communication devices may also be utilized, such as tablet computers or other portable electronic devices.

The communication devices 106, 108, 110, 114 may send information, including content such as digital photographs or video, to the service 102 for storage on the service and for providing access to the information by other communication devices. The communication devices 106, 108, 110, 114 may access the information stored on the service 102 and may receive information such as messages, digital photographs, and video from the service 102. Thus, information, including messages, digital photographs, and video may be shared via the network 104, utilizing the service 102.

Figure 2:
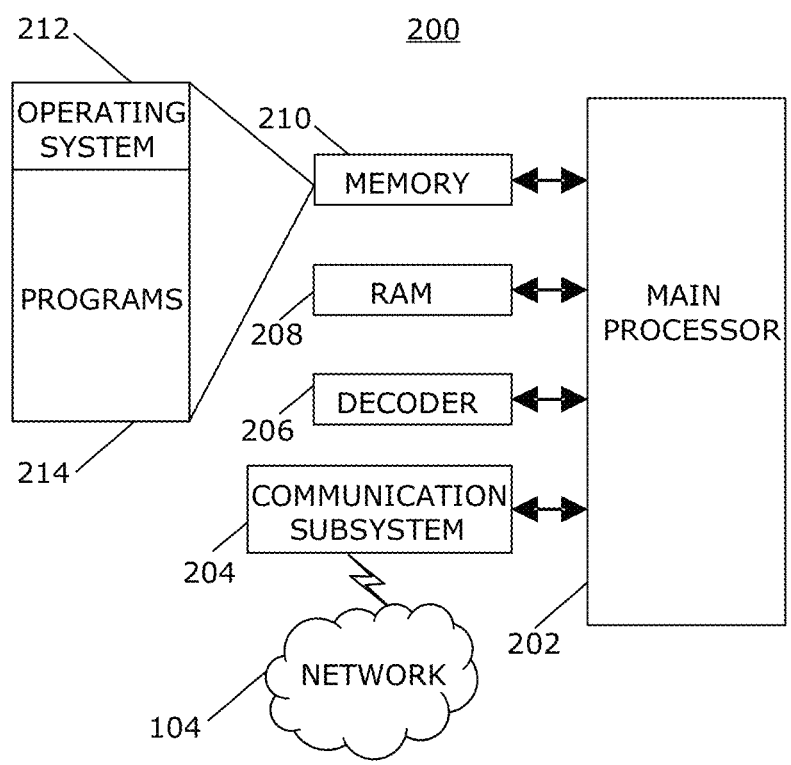
FIG. 2 is a block diagram of an example of an electronic device in accordance with the present disclosure.

A block diagram of one example of an electronic device 200 of the service 102 is illustrated in FIG. 2. The electronic device 200 includes multiple components, such as a processor 202 that controls the overall operation of the electronic device 200. Communication functions, including data communications, are performed through a communication subsystem 204. Data received by the electronic device 200 is decompressed and decrypted by a decoder 206. The communication subsystem 204 receives information from and sends information to remote electronic devices via the network 104.

The processor 202 interacts with other components, such as a Random Access Memory (RAM) 208, memory 210, and other device subsystems. An operating system 212 and software programs, applications, or components 214 that are executed by the processor 202, are stored in a persistent, updatable store such as the memory 210. Other software programs, applications, or components may also be accessible by the processor via other, connected electronic devices of the service 102. Other storage systems may also be accessible by the processor via other connected electronic devices of the service 102.

Figure 3:
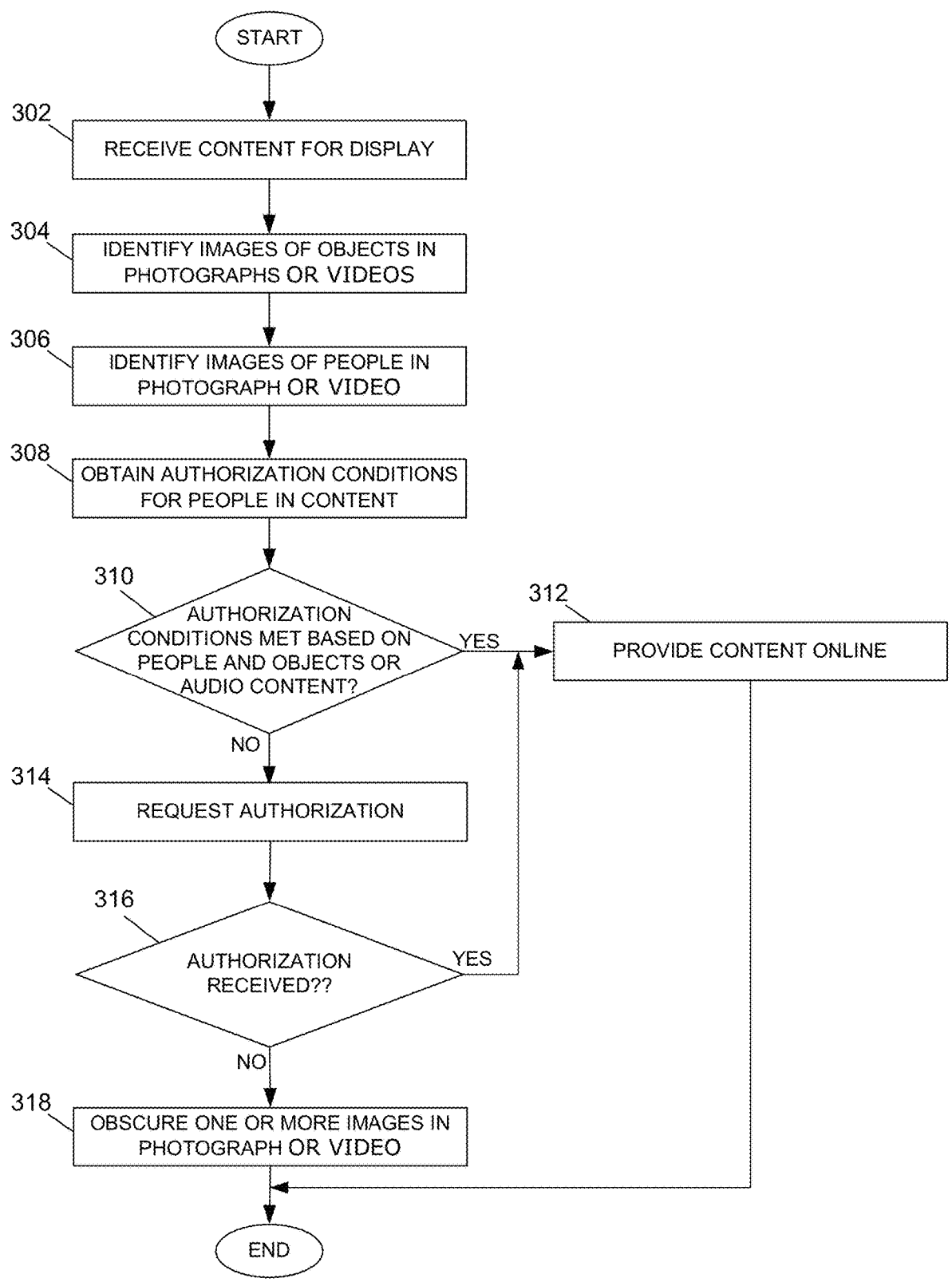
FIG. 3 is a flowchart illustrating a method of authorizing online sharing of a digital photograph or digital video in accordance with the disclosure.

A flowchart illustrating a method of authorizing online sharing of content including a digital photograph or video, is shown in FIG. 3. The method may be carried out by software executed, for example, by the processor 202. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 202, of the service 102 to perform the method may be stored in a computer-readable storage medium, such as a non-transitory computer-readable medium.

Content including a digital photograph or video is received at 302, at an electronic device of the service 102, such as the electronic device 200. The digital photograph or video may be a digital photograph or video captured utilizing a camera that is part of one of the communication devices, such as the communication devices 106, 108, 110, 114, coupled to the network 104, or may be a digital photograph or video captured utilizing another electronic device, such as a digital camera, scanner, or other device, and transferred by any suitable transfer method, to a communication device coupled to the network 104. The digital photograph or video is received at the electronic device 200 in response to uploading of the digital photograph or video to the service 102. The digital photograph or video may be uploaded, for example, utilizing an application on the communication device, or utilizing a web-based application accessible by the communication device.

Objects in the digital photograph or video are identified at 304. The objects are identified utilizing image recognition technology. Such image recognition technology may utilize distinctive characteristics, including shapes and surfaces, to identify the objects in the digital photographs or video by a comparison to known characteristics of known objects. The use of image recognition technology to identify objects in a digital photograph or video is known in the art.

Each person whose image, or images, is included in the digital photograph or video is identified at 306 by performing facial recognition on the images of individuals in the digital photograph or video utilizing known techniques. Alternatively or in addition, each person whose image is included in the digital photograph or video may be identified by a tag or tags applied to the photograph or descriptive matter added to the digital photograph or video.

Utilizing the identification of the images of the individuals, as performed at 306, authorization conditions associated with each person whose image is included in the content are obtained. The authorization conditions may include any suitable conditions under which authorization of sharing of a digital photograph or video via a service such as the service 102 is provided for the individual whose image is identified in the digital photograph or video, or conditions under which authorization of sharing of a digital photograph or video via a service such as the service 102 is not provided for the individual whose image is identified in the digital photograph or video.

The conditions may include any suitable conditions and the conditions may be user-definable for each individual. Thus, each individual may identify or define conditions under which automatic authorization of sharing of any digital photograph or video including that individual's image is provided or conditions under which automatic authorization of sharing of any digital photograph or video including that individual's image is declined.

To define the conditions, a user of a service, such as the service 102, may, for example, set one or more conditions in a privacy menu or submenu in an application for the service 102, utilizing one or more communication device, such as the communication devices 106, 108, 110, 114. Thus each individual user of the service 102 may define or set the condition or conditions, under which authorization is automatically provided or is declined, for the inclusion of that person's image in a digital photograph or video that is shared online.

For example, authorization may be dependent on the type of objects identified in the digital photograph or video. A user may identify one or more objects that, in response to images of such objects identified in the digital photograph, automatic authorization is declined. Alternatively, or in addition, the authorization may be dependent on the audio included along with a video. A user may identify one or more words or phrases that, in response to the inclusion of an audio portion of the video including those words or phrases, automatic authorization is declined.

In a particular example, automatic authorization may be declined in response to identification of an image of an alcoholic beverage included in the digital photograph or video. Alternatively, automatic authorization may be declined in response to identification of a combination of images included in the digital photograph or video. For example, when a threshold number of images of alcoholic beverages are included in the digital photograph or video, automatic authorization is declined. In another example, automatic authorization may be declined in response to identification of articles of clothing that the user is wearing. Automatic authorization may be declined based on a location or type of location identified based on background objects. Automatic authorization may be declined based on language deemed offensive in a video.

Authorization may also be dependent on other factors such as the identification of other individuals whose images are included in the digital photograph or video. For example, automatic authorization may be declined in response to a determination that an image of a particular individual is included the digital photograph or video, or individuals are included the digital photograph or video. Optionally, automatic authorization may be received in response to a determination that an image of a particular individual is included the digital photograph or video, or individuals are included the digital photograph or video.

In response to determining that all authorization conditions associated with each person whose image is included in the digital photograph or video are met at 310, online access to the content including the digital photograph or video is provided at 312 by posting the digital photograph to a site at the service 102. Thus, the determination that all authorization conditions are met for each person is based on the images of the objects identified in the digital photograph or video or the associated audio, and the images of the people identified in the digital photograph or video.

Optionally, automatic authorization may be provided for the person attempting to share the content including the digital photograph or video utilizing the social media services.

In response to determining that authorization conditions associated with a person whose image is included in the digital photograph or video are not met at 310, an authorization request is sent to that person at 314. Thus, for each person whose image is included in the digital photograph or video and whose associated authorization conditions are not met, a message is sent to the person requesting authorization to share the digital photograph or video online. The message may be any suitable message such as an email message, an MMS message, a message within a messaging application associated with the service 102, or any other suitable message. The message may include the digital photograph or may include a link for private access to facilitate viewing of the digital photograph by the person to whom the request for authorization is sent. The message may include selectable options to facilitate the response. For example, the message may include a selectable option to authorize and a selectable option to decline authorization. Optionally, the message may include a selectable option to modify or redact part of the digital photograph or video, for example, to remove audio or crop part of the photograph or video.

In response to receipt of authorization at 316 responsive to each authorization request sent at 314, the process continues at 312. Online access to the content including the digital photograph or video is provided at 312, for example, by posting the digital photograph or video to a site available utilizing the service 102.

In response to receipt of a response declining authorization at 316 by one or more persons to whom a message is sent, the process continues at 318. At least a portion of the digital photograph or video is concealed at 318. The portion of the digital photograph or video may be concealed by obscuring the image of each person for whom authorization is not received and then providing access to the digital photograph or video online at 312 by posting the digital photograph or video including the obscured image to a site available utilizing the service 102. The portion of the digital photograph or video may be also concealed by obscuring the image of one or more objects identified in the digital photograph or video and then sharing the digital photograph or video online at 312 by posting the digital photograph or video including the obscured image to a site available utilizing the service 102. Alternatively, the digital photograph may be concealed by rejecting the digital photograph or video such that online access to the digital photograph or video is not provided. Thus, the digital photograph or video is not posted online. Alternatively, access to the digital photograph or video may be restricted, for example, by limiting access to service account holders whose image is included in the digital photograph or video.

Absent receipt of a response to the authorization request sent at 314 within a threshold period of time, authorization may be automatically declined. Any suitable threshold period of time may be utilized. For example, absent a response to an authorization request within 48 hours, authorization may be declined.

If the user later changes the automatic authorization conditions, the content provided online for which automatic authorization was provided, may no longer be automatically authorized and authorization may be requested. Thus, the process may be repeated in the event that a user changes the authorization conditions and previously automatically authorized content may no longer be automatically authorized.

Figure 4:
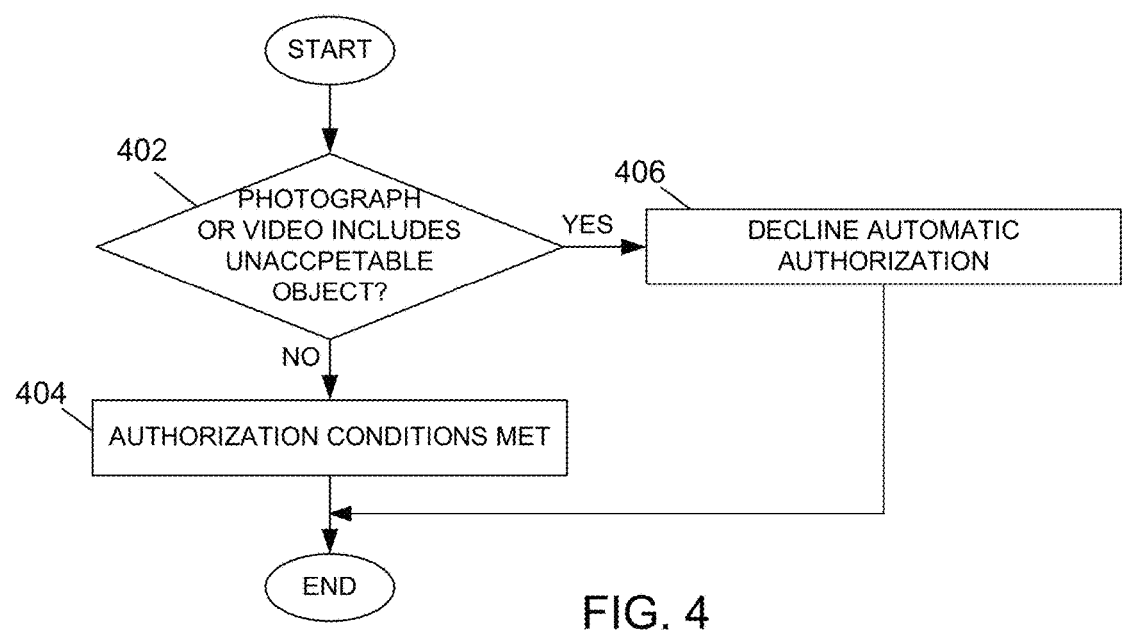
FIG. 4 through FIG. 6 are flowcharts illustrating examples of processes in the method of authorizing online sharing of digital photographs or digital video of FIG. 3.
Figure 5:
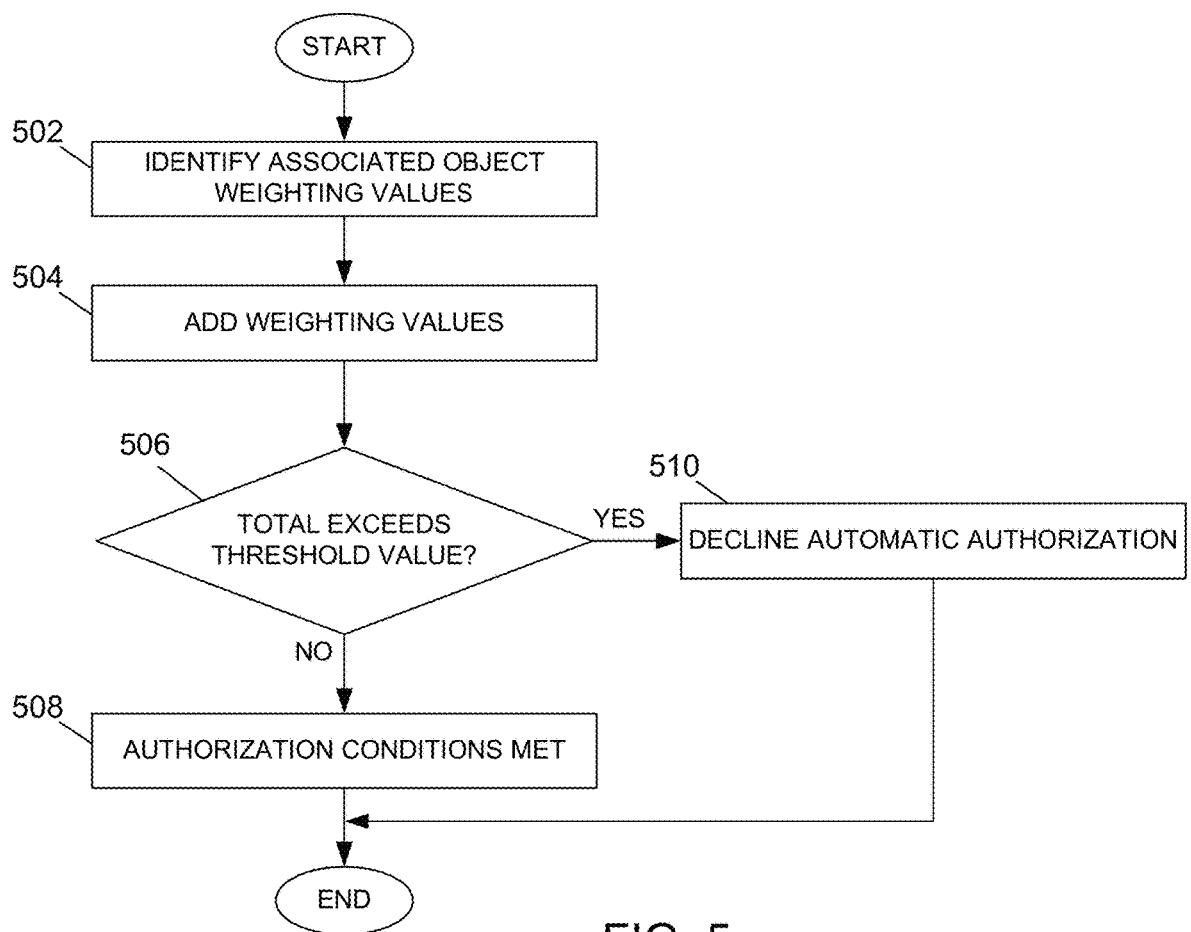
Figure 6:
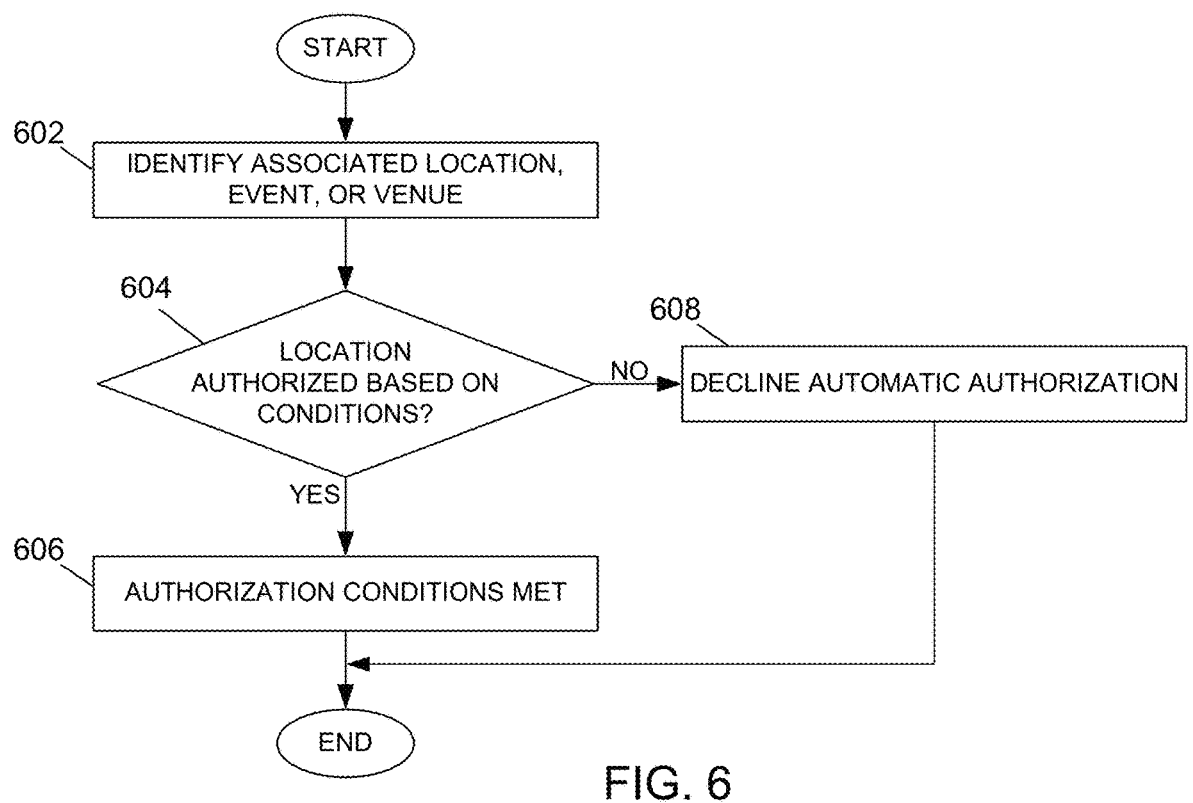

Examples of processes in the method of authorizing online sharing of digital photographs or video of FIG. 3 are illustrated in the flowcharts of FIG. 4 through FIG. 6.

An example of processes that may be included in the determination at 310 in FIG. 3 is illustrated in FIG. 4. The processes illustrated may be included in the determination of whether authorization conditions are met based on the people and objects in the digital photograph are shown.

Referring to both FIG. 3 and FIG. 4, an image of an object is identified in a digital photograph or video at 304 and an image of a person is identified in a digital photograph or video at 306. The authorization conditions associated with that person are obtained at 308. The authorization conditions include a condition in which authorization is not automatically provided if an image of a particular object is included in the digital photograph or video. The object may be any object such as a beer bottle or other alcoholic beverage, a cigarette, a bikini or swim shorts, or any other object.

In response to determining that the digital photograph or video includes the object, the digital photograph or video is not automatically authorized at 406 and the authorization conditions are not met. Thus, the process continues at 314 where authorization is requested. More than one object may be included in a list of unacceptable objects, the presence of any one of which results in automatic authorization being declined at 406 and the process continuing at 314.

In response to determining that the digital photograph does not include the object, authorization of the digital photograph is not declined at 404 and the process continues.

Another example of processes of the determination at 310 in FIG. 3 is illustrated in FIG. 5. The processes illustrated may be included in the determination of whether authorization conditions are met based on the people and objects in the digital photograph or video are shown. The processes of FIG. 5 may be carried out alone or in combination with other processes, such as the processes of FIG. 4 and FIG. 6, for example.

Referring to FIG. 3 and FIG. 5, images of objects are identified in a digital photograph or video at 304 and an image of a person is identified in the digital photograph at 306. The authorization conditions associated with that person are obtained at 308. The authorization conditions include a condition in which a weighting value is associated with objects identified in the digital photograph or video. The weighting value associated with each of the objects identified in the digital photograph or video is identified at 502. The weighting values associated with objects are summed to provide a total value at 504. At 506, the total value is compared to a threshold value that is included in the authorization conditions associated with the person whose image is identified in the digital photograph or video. In response to determining that the total value meets or exceeds a threshold value at 506, the digital photograph or video is automatic authorization is declined at 510 and the authorization conditions are not met. Thus, the process continues at 314 where authorization is requested. More than one object may be associated with a weighting value and each type of object may be associated with a different weighting value.

In response to determining that the weighting value does not meet or exceed the threshold value, automatic authorization is not declined at 508 and the process continues.

Thus, for example, a value of 1 may be associated with each beer bottle in a digital photograph or video. A threshold value of 3 may be utilized such that a digital photograph or video that includes two beer bottles, each associated with a value of 1, results in a sum of 2, which is less than the threshold. Automatic authorization is not declined at 508 and the process continues. On the other hand, a digital photograph or video that includes five beer bottles, each associated with a value of 1, results in a sum of 5, which is greater than the threshold. Automatic authorization is declined and the process continues at 314.

Yet another example of processes of the determination at 310 in FIG. 3 are illustrated in FIG. 6. The processes illustrated may be included in the determination of whether authorization conditions are met based on the people and objects in the digital photograph or video are shown. The processes of FIG. 6 may be carried out alone or in combination with other processes, such as the processes of FIG. 4 and FIG. 5, for example.

Referring to FIG. 3 and to FIG. 6, images of objects in a digital photograph or video are identified at 304 and an image of a person is identified in a digital photograph or video at 306. The authorization conditions associated with that person are obtained at 308. The authorization conditions include a condition in which automatic authorization is dependent on the location, event, or venue at which the digital photograph or video is captured. For example, the automatic authorization may be declined if the digital photograph or video is captured in a bar, a casino, a beach, or any other location. The location, event, or venue is identified at 602 based on the objects identified in the digital photograph or video.

In response to determining that the digital photograph or video is captured at a location, event, or venue that is identified in the authorization conditions for declining automatic authorization, a determination is made that authorization of the digital photograph or video is declined at 608 and the authorization conditions are not met. Thus, the process continues at 314 where authorization is requested.

In response to determining that the digital photograph or video is not captured at a location, event, or venue that is identified in the authorization conditions for declining automatic authorization, a determination is made that authorization of the digital photograph or video is not declined at 606 and the process continues.

In the above description, the method of authorizing online sharing of content such as digital photographs or video is carried out by the service 102, which may be a social media and social networking service. Alternatively, the method of authorizing online sharing of such content may be carried out by a third party, the services of which, a user may register for. For example, a user may register with the third party and provide a digital photograph for use in facial recognition. The social networking sites to which the process is applied may also be selected. The third party service operates in conjunction with the social networking service(s) by carrying out the steps of the method to provide the privacy control.

Advantageously, control may be exercised over online digital photographs and video posted to social media sites by others. By identifying both people and objects in the digital photographs and video, automatic authorization to make digital photographs or video available online may be provided. Automatic authorization may also be declined based on the objects in the digital photographs or video.

The scope of the claims should not be limited by the preferred embodiments set forth in the examples, but should be given the broadest interpretation consistent with the description as a whole.

What is claimed is:

1. A method for authorizing online sharing of a digital photograph or video, the method comprising:
    receiving, at an electronic device, content including the digital photograph or video;
    identifying an image of a person in the content;
    identifying authorization conditions associated with the person, wherein the authorization conditions include a condition that authorization to display the image of the person is not provided in response to at least one of a predetermined object being displayed and a predetermined word or phrase being included in the digital photograph or video;
    identifying an image of an object or audio in the content;
    based on both the image of the person identified and the image of the object or audio identified, determining if the authorization conditions associated with the person are met;
    in response to determining that the authorization conditions are met, providing online access to the digital photograph or video;
    in response to determining that the authorization conditions are not met, concealing at least the person's image in the digital photograph or video, wherein the authorization conditions are not met in response to determining that the object is the predetermined object or in response to determining that the audio includes the predetermined word or phrase.

2. The method according to claim 1, wherein concealing at least a portion of the content comprises rejecting the digital photograph or video such that online access to the digital photograph or video is not provided.

3. The method according to claim 1, wherein concealing at least a portion of the content comprises obscuring the image of the person and providing online access to the digital photograph or video with the image of the person obscured.

4. The method according to claim 1, comprising identifying images of a plurality of objects, including the image of the object, and wherein determining if the authorization conditions associated with the person are met comprises determining based on images of each of the objects identified.

5. The method according to claim 1, comprising:
    identifying images of a plurality of objects, including the image of the object;
    identifying a value associated with each of the objects identified; and
    summing the value associated with the objects to provide a total; and
    wherein determining if the authorization conditions associated with the person are met comprises determining if the total exceeds a threshold value.

6. The method according to claim 1, wherein providing online access to the digital photograph or video comprises posting the photograph or video to an online site.

7. The method according to claim 1, wherein identifying the image of a person in the content comprises identifying the person utilizing facial recognition.

8. The method according to claim 1, wherein identifying the image of a person in the content comprises identifying the person based on an applied tag.

9. The method according to claim 1, comprising identifying images of people in the content, including the image of the person;
    identifying authorization conditions associated with each person identified in the content;
    determining if the authorization conditions associated with each person are met based on respective authorization conditions and based on the image of the object identified;
    wherein providing online access to the digital photograph or video comprises providing online access in response to determining that the authorization conditions associated with each person are met.

10. The method according to claim 1, comprising, in response to determining that the authorization conditions are not met, requesting authorization from the person identified prior to providing online access to the digital photograph or video.

11. The method according to claim 10, wherein requesting authorization comprises sending an electronic message to the person identified, the electronic message requesting that the person authorize or decline authorization.

12. The method according to claim 10, comprising, in response to receipt of authorization from the person identified, providing online access to the digital photograph or video.

13. The method according to claim 10, comprising, absent receipt of authorization from the person identified, obscuring the image of the person in the digital photograph or video and providing online access to the digital photograph or video including the obscured image of the person.

14. A non-transitory computer-readable medium having computer-readable code stored thereon, the computer-readable code executable by at least one processor of an electronic device to:
  receive, at the electronic device, content including a digital photograph or video;
  identify an image of a person in the content;
  identify authorization conditions associated with the person, wherein the authorization conditions include a condition that authorization to display the image of the person is not provided in response to at least one of a predetermined object being displayed and a predetermined word or phrase being included in the digital photograph or video;
  identify an image of an object or audio in the content;
  based on both the image of the person identified and the image of the object or audio identified, determine if the authorization conditions associated with the person are met;
  in response to determining that the authorization conditions are met, provide online access to the digital photograph or video,
  in response to determining that the authorization conditions are not met, concealing at least the person's image in the digital photograph or video, wherein the authorization conditions are not met in response to determining that the object is the predetermined object or in response to determining that the audio includes the predetermined word or phrase.

15. An electronic device comprising:
  a communication subsystem for communication, over a network, with remote devices;
  a processor operably coupled to the communication subsystem to:
    receive, at the electronic device, content including a digital photograph or video;
    identify an image of a person in the content;
    identify authorization conditions associated with the person, wherein the authorization conditions include a condition that authorization to display the image of the person is not provided in response to at least one of a predetermined object being displayed and a predetermined word or phrase being included in the digital photograph or video;
    identify an image of an object or audio in the content;
    based on both the image of the person identified and the image of the object or audio identified, determine if the authorization conditions associated with the person are met;
    in response to determining that the authorization conditions are met, provide online access to the digital photograph or video,
    in response to determining that the authorization conditions are not met, conceal at least the person's image in the digital photograph or video, wherein the authorization conditions are not met in response to determining that the object is the predetermined object or in response to determining that the audio includes the predetermined word or phrase.

16. The electronic device according to claim 15, wherein the processor is configured to, in response to determining that the authorization conditions are not met, request authorization from the person identified prior to providing online access to the digital photograph or video.

17. The electronic device according to claim 16, wherein, in response to receipt of authorization from the person identified, online access to the digital photograph or video is provided.

18. The electronic device according to claim 16, wherein, absent receipt of authorization from the person identified, the processor is configured to obscure the image of the person in the digital photograph or video and provide online access to the digital photograph or video including the obscured image of the person.

19. The electronic device according to claim 15, wherein the processor is configured to:
  identify images of a plurality of objects, including the image of the object;
  identify a value associated with each of the objects identified; and
  sum the value associated with the objects to provide a total; and
  wherein the authorization conditions associated with the person are met if the total is less than a threshold value.

* * * * *